United States Patent
Li et al.

(10) Patent No.: US 9,855,858 B2
(45) Date of Patent: Jan. 2, 2018

(54) CONTROL DEVICE FOR ELECTRIC VEHICLE

(71) Applicant: NTN CORPORATION, Osaka (JP)

(72) Inventors: Guodong Li, Fuji (JP); Yiqing Liu, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/054,680

(22) Filed: Feb. 26, 2016

(65) Prior Publication Data
US 2016/0176313 A1 Jun. 23, 2016

Related U.S. Application Data

(63) Continuation of application No. PCT/JP2014/072691, filed on Aug. 29, 2014.

(30) Foreign Application Priority Data

Sep. 3, 2013 (JP) ................................. 2013-181803

(51) Int. Cl.
*B60L 15/20* (2006.01)
*B60L 15/00* (2006.01)
(Continued)

(52) U.S. Cl.
CPC ....... *B60L 15/2036* (2013.01); *B60L 11/1803* (2013.01); *B60L 15/007* (2013.01);
(Continued)

(58) Field of Classification Search
CPC B60L 15/2036; B60L 11/1803; B60L 15/007; B60L 15/025; B60L 15/20;
(Continued)

(56) References Cited

U.S. PATENT DOCUMENTS 4,443,747 A * 4/1984 Chausse .................... H02P 1/52
318/723
5,083,039 A * 1/1992 Richardson ........... F03D 7/0272
290/44
(Continued)

FOREIGN PATENT DOCUMENTS

CN 102616150 A 8/2012
EP 1 707 428 A2 10/2006
(Continued)

OTHER PUBLICATIONS

International Preliminary Report on Patentability dated Mar. 17, 2016 in corresponding International Patent Application No. PCT/JP2014/072691.
(Continued)

*Primary Examiner* — Tuan C. To (57) ABSTRACT

A control device includes an ECU and an inverter device having power circuitry including an inverter and a motor control unit. A rotation angle sensor detects a rotation angle of a motor. The power circuitry receives a rotation angle of the motor from the rotation angle sensor to perform control in accordance with the rotation angle of the rotor, the control being based on a torque command mapping table in which a relationship between a rotation speed and a torque of the motor is defined. The power circuitry includes an adjustment module adjusting the torque command mapping table with respect to a torque command from the ECU and a speed of the electric vehicle.

4 Claims, 7 Drawing Sheets

(51) Int. Cl.
| | |
|---|---|
| *B60L 11/18* | (2006.01) |
| *B60L 15/02* | (2006.01) |
| *B60L 15/32* | (2006.01) |
| *H02P 5/48* | (2016.01) |
| *H02P 5/50* | (2016.01) |
| *H02P 6/04* | (2016.01) |
| *H02P 21/00* | (2016.01) |

(52) U.S. Cl.
CPC ............ *B60L 15/025* (2013.01); *B60L 15/20* (2013.01); *B60L 15/32* (2013.01); *H02P 5/48* (2013.01); *H02P 5/50* (2013.01); *H02P 6/04* (2013.01); *H02P 21/0025* (2013.01); *B60L 2220/44* (2013.01); *B60L 2220/46* (2013.01); *B60L 2240/421* (2013.01); *B60L 2240/423* (2013.01); *B60L 2260/42* (2013.01); *B60L 2260/46* (2013.01); *Y02T 10/643* (2013.01); *Y02T 10/648* (2013.01); *Y02T 10/7005* (2013.01); *Y02T 10/7275* (2013.01)

(58) Field of Classification Search
CPC .. B60L 15/32; B60L 2220/44; B60L 2220/46; B60L 2240/421; B60L 2240/423; B60L 2260/46; H02P 5/48; H02P 5/50; H02P 6/04; H02P 21/0025; Y02T 10/643; Y02T 10/648; Y02T 10/7005; Y02T 10/7275
See application file for complete search history.

(56) References Cited

U.S. PATENT DOCUMENTS

| | | | | |
|---|---|---|---|---|
| 5,365,153 A | * | 11/1994 | Fujita | B06B 1/0261 318/34 |
| 5,629,567 A | * | 5/1997 | Kumar | B60L 3/0038 290/3 |
| 6,396,229 B1 | * | 5/2002 | Sakamoto | H02P 6/18 318/400.02 |
| 7,151,355 B2 | | 12/2006 | Izumi et al. | |
| 7,317,295 B2 | | 1/2008 | Izumi et al. | |
| 7,609,014 B2 | | 10/2009 | Royak et al. | |
| 8,768,550 B2 | | 7/2014 | Saito | |
| 8,791,716 B2 | | 7/2014 | Tanimoto et al. | |
| 8,849,538 B2 | | 9/2014 | Kato et al. | |
| 9,002,556 B2 | | 4/2015 | Nakamura et al. | |
| 9,031,724 B2 | | 5/2015 | Ozaki | |
| 9,205,760 B2 | | 12/2015 | Makino | |
| 9,586,484 B2 | * | 3/2017 | Li | H02P 6/16 |
| 2003/0102833 A1 | * | 6/2003 | Murakami | H02P 6/24 318/362 |
| 2005/0218858 A1 | * | 10/2005 | Takemori | H02P 8/16 318/685 |
| 2006/0220608 A1 | | 10/2006 | Izumi et al. | |
| 2007/0096683 A1 | | 5/2007 | Izumi et al. | |
| 2008/0094015 A1 | | 4/2008 | Royak et al. | |
| 2008/0116842 A1 | | 5/2008 | Cheng et al. | |
| 2008/0197796 A1 | * | 8/2008 | Bae | B60L 11/1861 318/432 |
| 2008/0258656 A1 | | 10/2008 | Kawasaki et al. | |
| 2009/0026994 A1 | * | 1/2009 | Namuduri | B62D 5/049 318/565 |
| 2009/0243522 A1 | * | 10/2009 | Suhama | B60L 7/16 318/376 |
| 2010/0222950 A1 | * | 9/2010 | Ueoka | B60K 6/365 701/22 |
| 2011/0232980 A1 | | 9/2011 | Nomura et al. | |
| 2011/0298403 A1 | | 12/2011 | Yamamoto et al. | |
| 2012/0046832 A1 | * | 2/2012 | Kariatsumari | B62D 5/0463 701/41 |
| 2012/0139460 A1 | * | 6/2012 | Senkou | H02P 21/0096 318/400.02 |
| 2012/0146683 A1 | | 6/2012 | Tanimoto et al. | |
| 2012/0191281 A1 | | 7/2012 | Saito | |
| 2012/0323430 A1 | * | 12/2012 | Nakamura | B60L 11/1803 701/22 |
| 2013/0124024 A1 | | 5/2013 | Nakamura et al. | |
| 2013/0165293 A1 | | 6/2013 | Shinohara et al. | |
| 2013/0338866 A1 | | 12/2013 | Ozaki | |
| 2014/0046568 A1 | | 2/2014 | Kato et al. | |
| 2015/0012158 A1 | | 1/2015 | Makino | |
| 2015/0028792 A1 | * | 1/2015 | Tang | H02P 21/06 318/798 |

FOREIGN PATENT DOCUMENTS

| | | |
|---|---|---|
| EP | 1 914 879 A2 | 4/2008 |
| EP | 2 472 716 A1 | 7/2012 |
| EP | 2 578 439 A1 | 4/2013 |
| JP | 09238492 A * | 9/1997 |
| JP | 2000-152409 | 5/2000 |
| JP | 3086409 | 7/2000 |
| JP | 4372770 | 9/2009 |
| JP | 2011-201370 | 10/2011 |
| JP | 4986755 | 5/2012 |
| JP | 2012-178919 | 9/2012 |
| JP | 2013-74769 | 4/2013 |
| JP | 2013-147237 | 8/2013 |
| JP | 2013-158123 | 8/2013 |
| JP | 2014239612 A * | 12/2014 |
| WO | WO 2012/144058 A1 | 10/2012 |

OTHER PUBLICATIONS

Extended European Search Report dated Mar. 6, 2017 in corresponding European Patent Application No. 14842022.7.
Chinese Office Action dated Feb. 3, 2017 in corresponding Chinese Patent Application No. 201480048394.6.
International Search Report dated Nov. 11, 2014, in corresponding International Application No. PCT/JP2014/072691.
Notification of Reason(s) for Rejection dated Jun. 6, 2017 in Corresponding Japanese Patent Application 2013-181803.

* cited by examiner

TORQUE COMMAND MAPPING TABLE — 35

| T\N | Rot_0 | Rot_1 | ... | Rot_m |
|---|---|---|---|---|
| Trq0 | $(Ia, \beta)\_00$ | $(Ia, \beta)\_01$ | ... | $(Ia, \beta)\_0m$ |
| Trq1 | $(Ia, \beta)\_10$ | $(Ia, \beta)\_11$ | ... | $(Ia, \beta)\_1m$ |
| ... | ... | ... | ... | ... |
| Trqn | $(Ia, \beta)\_n0$ | $(Ia, \beta)\_n1$ | ... | $(Ia, \beta)\_nm$ |

Fig. 6

MOTOR DRIVE COMMAND VOLTAGE MAPPING TABLE — 39

| T\N | Rot_0 | Rot_1 | ... | Rot_m |
|---|---|---|---|---|
| Trq0 | $Vu*\_00$ | $Vu*\_01$ | ... | $Vu*\_0m$ |
| Trq1 | $Vu*\_10$ | $Vu*\_11$ | ... | $Vu*\_1m$ |
| ... | ... | ... | ... | ... |
| Trqn | $Vu*\_n0$ | $Vu*\_n1$ | ... | $Vu*\_nm$ |

CONVENTIONAL METHOD

Fig. 8B

PROPOSED METHOD

CONTROL DEVICE FOR ELECTRIC VEHICLE

CROSS REFERENCE TO THE RELATED APPLICATION

This application is a continuation application, under 35 U.S.C. §111(a), of international application No. PCT/JP2014/072691, filed Aug. 29, 2014, which claims Convention priority to Japanese patent application No. 2013-181803, filed Sep. 3, 2013, the entire disclosure of which is herein incorporated by reference as a part of this application.

BACKGROUND OF THE INVENTION

Field of the Invention

The present invention relates to a control device for an electric vehicle including in-wheel motor drive devices configured to drive either two front wheels or two rear wheels of the vehicle, or the four wheels, the control device automatically adjusting a torque command mapping table used for controlling each traction motor in the electric vehicle.

Description of Related Art

As an electric vehicle, a vehicle including, as left and right drive wheels which are driven by respective independent traction motors is publicly known (Patent Document 1). Rotation of each motor is transmitted to the corresponding wheel via a reducer and a wheel bearing. As each motor, for example, an IPM motor (interior permanent magnet synchronous motor) is used.

RELATED DOCUMENT

Patent Document

[Patent Document 1] JP Laid-open Patent Publication No. 2012-178919

SUMMARY OF THE INVENTION

However, in each motor, a problem, such as attenuation of the magnetic force of the permanent magnet, arises due to aged deterioration. Due to the influence thereof, a torque developed in the motor cannot follow a torque command and tends to decrease. Furthermore, output values of left and right motor torques with respect to an accelerating signal may be different from each other. This can be because, for example, due to the running environments of the motors at left and right wheels, the degree of deterioration is different between the motors. The difference between the output values of the left and right motor torques influences running of the vehicle.

An object of the present invention is to provide a control device for an electric vehicle which control device is able to output a desired motor torque when a problem due to aged deterioration or the like arises in a traction motor of the electric vehicle. Another object of the present invention is to provide a control device for an electric vehicle which control device is able to output equivalent motor torques from left and right motors, that is, such motor torques from the left and right motors that a difference between output values of the respective motor torques is less than a predetermined value, thereby alleviating influence on running of the vehicle.

Hereinafter, in order to facilitate understanding of the present invention, the present invention will be described with reference to the reference numerals in embodiments for the sake of convenience.

A control device for an electric vehicle according to the present invention includes:

an ECU 21 which is an electric control unit configured to perform general control of the vehicle; and an inverter device 22 including: a power circuitry 28 including: an inverter 31 configured to convert a DC power into an AC power used to drive a traction motor 6; and a motor control unit 29 configured to control the power circuitry 28 in accordance with a torque command from the ECU 21. In the control device a rotation angle sensor 36 configured to detect a rotation angle of the motor 6 is provided, the motor control unit 29 receives a rotation angle of a rotor of the motor 6 from the rotation angle sensor 36 to perform control in accordance with the rotation angle of the rotor, the control being based on a torque command mapping table 35 in which a command value is determined based on a rotation speed and a torque of the motor, and the motor control unit 29 includes a torque command mapping table adjustment module 38 configured to adjust the torque command mapping table 35, according to a predetermined rule, with respect to: a speed of the vehicle obtained by a vehicle speed detection module based on the rotation angle that is detected by the rotation angle sensor 36; and the torque command from the ECU 21.

The "to adjust" means to change values within the torque command mapping table, and, for example, any of a primary current Ia and a current advance angle β within the torque command mapping table are adjusted.

According to this configuration, the torque command mapping table adjustment module 38 adjusts the torque command mapping table 35, according to the predetermined rule, with respect to: the vehicle speed fed from the vehicle speed detection module; and the torque command from the ECU 21, upon application of an external operation signal such as an input signal from a switch, a button, or the like during running of the vehicle, as described below. For example, in the case where the vehicle includes motors 6 which independently drive left and right wheels 2, on the condition of the accelerating signal that is maintained at a constant value, one motor 6 is torque controlled for which the torque command mapping table 35 is adjusted, and the other motor 6 is rotation speed controlled. The adjustment of the mapping table is performed, for example, on the basis of a constant rotation speed under a condition of a constant command torque value.

"During running of the vehicle", preferably, immediately after the vehicle starts moving from a vehicle stop state, for example, when the vehicle runs at a low speed of 30 km/h or less, the torque command mapping table adjustment module 38 performs the adjustment. The vehicle speed detection module may calculate a vehicle speed by differentiating the rotation angle of the motor 6 detected by the rotation angle sensor 36.

1. For example, the torque command mapping table adjustment module 38 extracts a phase command voltage effective value for the one motor 6 from a motor drive command voltage mapping table 39 in which a phase command voltage is defined with respect to a rotation speed and a torque of the motor, and automatically adjusts a torque command mapping table (Ia, β) in such a way that the phase command voltage effective value and a phase drive voltage effective value for the same phase is equal to or equivalent to each other. The torque command mapping table corresponds to the motor drive command voltage mapping table 39.

2. In the method for adjusting the torque command mapping table (Ia, β), for example, the primary current Ia and the current advance angle β are adjusted so as to be increased. The adjusted primary current Ia and the adjusted current advance angle β are recorded in the torque command mapping table (Ia, β). Thereafter, the command value is derived from the torque command mapping table 35, so that the one motor 6 is controlled.

In adjusting the torque command mapping table 35 for the other motor 6, the one motor 6 is rotation speed controlled while the other motor 6 is torque controlled, whereby the torque command mapping table 35 can be adjusted similarly to the above. Therefore, even if a problem due to aged deterioration or the like arises in a motor 6, a desired motor torque can be developed in the motor 6 by adjusting the torque command mapping table 35 for the motor 6. For example, influence, on running of the vehicle, due to left and right wheels in which the motor torques developed are different from each other, can be alleviated by causing the left and right motors 6 to exert equal or equivalent motor torques. Thus, the straight-running stability of the vehicle is improved.

The vehicle may include a plurality of the motors 6 which independently drive left and right wheels 2, and the motor control unit 29 may be provided for each of the motors. For example, if the degree of deterioration due to aged deterioration or the like is different between the left and right motors 6, the torque command mapping table adjustment module 38 of each motor control unit 29 adjusts the torque command mapping table 35 for each motor 6 in such a way that equal or equivalent motor torques can be developed in the left and right motors 6 during running of the vehicle. Therefore, influence on running of the vehicle due to the difference between the torques developed the left and right motors is alleviated.

When the torque command mapping table adjustment module 38 adjusts the torque command mapping table 35 for one of the motors 6, the one of the motors 6 may torque controlled by the motor control unit 29 associated therewith while the other motor 6 may be rotation speed controlled. For example, in adjusting the torque command mapping table for the right motor 6 which drives the right wheel 2, the left motor 6 which drives the left wheel 2 is controlled through rotation speed control, and the right motor 6 is controlled through torque control. On the other hand, in adjusting the torque command mapping table 35 for the left motor 6, the right motor 6 is controlled through rotation speed control, and the left motor 6 is controlled through torque control.

The motor control unit 29 may include a motor drive command voltage mapping table 39 in which a phase command voltage with respect to a rotation speed and a torque of the motor is defined, and the torque command mapping table adjustment module 38 may extracts a phase command voltage for the one of the motors 6 from the motor drive command voltage mapping table 39 in a state where the one of the motors 6 rotates at a constant motor rotation speed, and adjusts the torque command mapping table 35 in such a way that the extracted phase command voltage is equal to or equivalent to a phase drive voltage. In this case, the torque command mapping table adjustment module 38 extracts a phase command voltage effective value (e.g., a U-phase command voltage effective value) for the one of the motors 6 from the motor drive command voltage mapping table 39 in a state where the one of the motors 6 rotates at a constant motor rotation speed, and automatically adjusts the torque command mapping table (Ia, β) in such a way that the phase command voltage effective value Vu and a U-phase drive voltage effective value are equal to or equivalent to each other. The torque command mapping table 35 corresponds to the motor drive command voltage mapping table 39. The U-phase command voltage effective value Vu can be calculated, for example, from data of an instantaneous value recorded by a CPU.

In adjusting the torque command mapping table 35 in such a way that the extracted phase command voltage is equal to or equivalent to the phase drive voltage as described above, the torque command mapping table adjustment module may adjust the torque command mapping table such that, if an absolute value of subtracting the phase drive voltage from the phase command voltage is less than a predetermined threshold, the torque command mapping table adjustment module determines that the phase command voltage is equivalent to the phase drive voltage.

The motor 6 may drive any one or both of a front wheel and a rear wheel of the vehicle and may constitute a part of an in-wheel motor drive device 8 which includes the motor 6, a wheel bearing 4, and a reducer 7.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
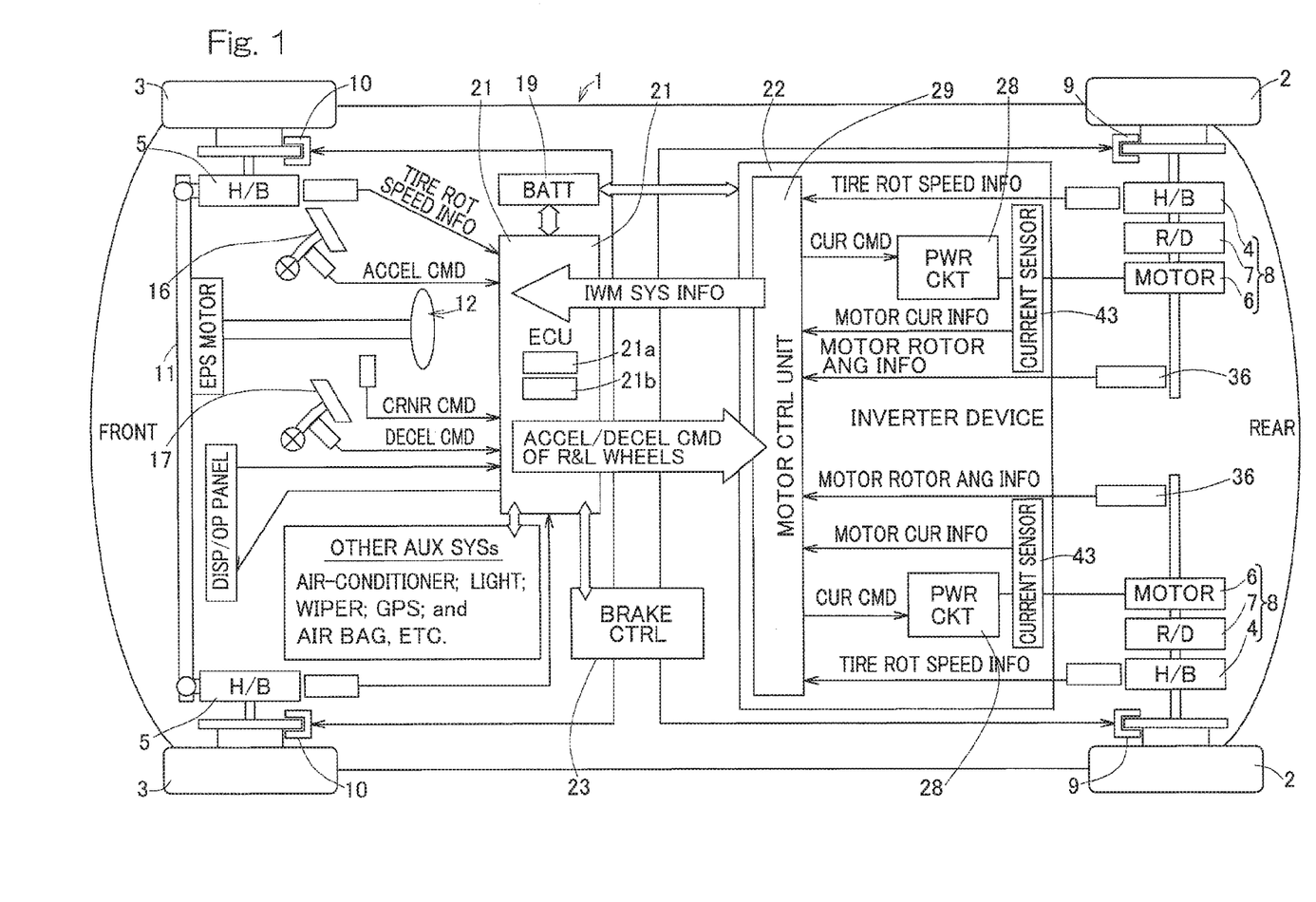
FIG. 1 is a block diagram of a schematic configuration showing an electric vehicle according to an embodiment of the present invention in a plan view.

A control device for an electric vehicle according to an embodiment of the present invention will be described with reference to FIG. 1 to FIGS. 8A and 8B. FIG. 1 is a block diagram of a schematic configuration showing the electric vehicle according to the embodiment in a plan view. As shown in FIG. 1, the electric vehicle is a four-wheel vehicle which includes a vehicle body 1 with left and right rear wheels 2 as drive wheels and with left and right front wheels 3 as driven wheels which are steering wheels. The drive wheels 2 and the driven wheels 3 are both equipped with tires and are supported by the vehicle body 1 via respective wheel bearings 4 and 5.

In FIG. 1, the wheel bearings 4 and 5 are labeled with "H/B" which is an abbreviation for hub bearing. The left and right drive wheels 2 are driven by respective independent traction motors 6. Rotation of each motor 6 is transmitted via a reducer 7 and the wheel bearing 4 to the corresponding wheel 2. The motor 6, the reducer 7, and the wheel bearing 4 are integrally assembled with each other to form an in-wheel motor drive device 8. The in-wheel motor drive device 8 is partly or entirely disposed within the wheel 2. Each of the motors 6 includes a synchronous or inductive AC motor. The reducer 7 includes, for example, a cycloidal reducer. The wheels 2 and 3 are equipped with respective electromechanical brakes 9 and 10. The steering wheels 3, 3, which are the left and right front wheels, are turnable via a turning mechanism 11 and are steered with steering unit 12.

Figure 2:
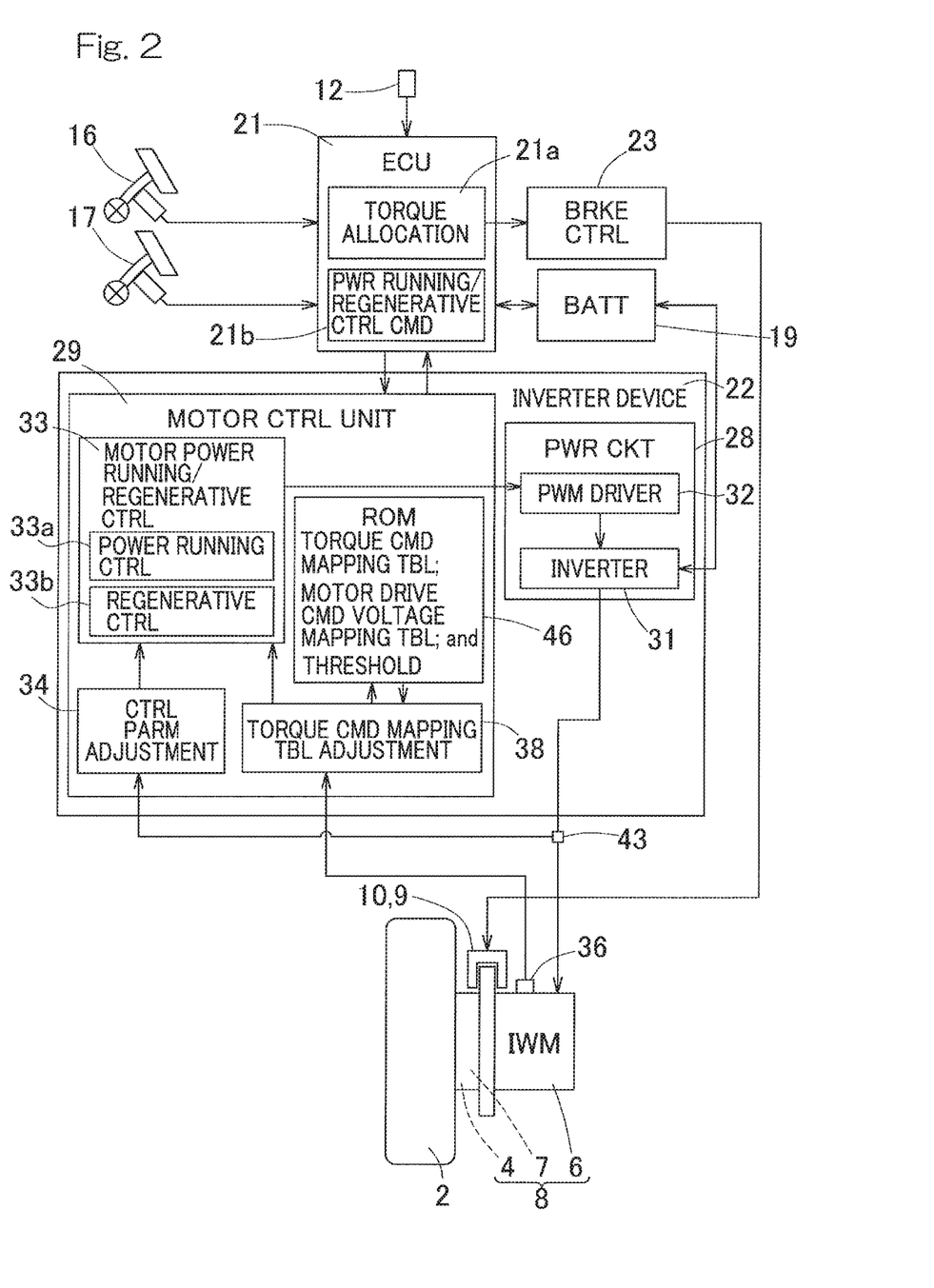
FIG. 2 is a block diagram of a schematic configuration of an inverter device and the like of the electric vehicle shown in FIG. 1.

FIG. 2 is a block diagram of a schematic configuration of an inverter device and the like of the electric vehicle. As shown in FIG. 2, the electric vehicle includes an ECU 21 which is an electric control unit configured to perform general control of the vehicle, and an inverter device 22 configured to perform control of the traction motors 6 according to commands from the ECU 21. The ECU 21 includes a computer, programs which are executed by the computer, and various electronic circuits. The ECU 21 includes a torque allocation module 21a and a power running/regenerative control command module 21b.

The torque allocation module 21a is configured to generate an accelerating/decelerating command as a torque command value, which is to be sent to each of the traction motors 6, 6 of the left and right wheels, on the basis of an accelerating command outputted from accelerator manipulation unit 16, a decelerating command outputted from a brake manipulation unit 17, and a cornering command from the steering unit 12, and to output the accelerating/decelerating command to each inverter device 22. The torque allocation module 21a has a function to, in response to a decelerating command outputted from the brake manipulation unit 17, generate a braking torque command value allocated to regenerative braking of the motor 6 and a braking torque command value allocated to the operation of the brakes 9 and 10. The braking torque command value allocated to regenerative braking is reflected in a torque command value which is the accelerating/decelerating command which is to be sent to the motors 6 of the left and right wheels. The braking torque command value allocated to the operation of the brakes 9 and 10 is outputted to a brake controller 23. The power running/regenerative control command module 21b is configured to send a command flag for switching between acceleration (power running) and deceleration (regeneration), to a motor power running/regenerative control module 33 of a motor control unit 29 described later.

The inverter device 22 includes a power circuitry 28 provided for each motor 6, and the motor control unit 29 configured to control the power circuitry 28. The inverter device 22 is provided for each motor, which is not shown. Although only the single inverter device 22, the single power circuitry 28, and the single motor control unit 29 are illustrated in FIG. 2, the two inverter devices 22, the two power circuitries 28, and the two motor control circuitries 29 are present in this embodiment. The power circuitry 28 includes an inverter 31 configured to convert a DC power from a battery 19 to a three-phase AC power used for power running and regeneration of the motor 6, and a PWM driver 32 configured to control the inverter 31. The motor 6 includes a three-phase synchronous motor or the like. The motor 6 is provided with a rotation angle sensor 36 configured to detect a rotation angle for calculating an electrical angle of a rotor of the motor. The inverter 31 includes a plurality of semiconductor switching elements, and the PWM driver 32 performs pulse width modulation according to an inputted current command and sends ON/OFF commands to each of the semiconductor switching elements.

The motor control unit 29 includes a computer, programs which are executed by the computer, and an electronic circuit. The motor control unit 29 includes the motor power running (drive)/regenerative control module 33 as a basic control section. The motor power running (drive)/regenerative control module 33 is configured to convert an accelerating (power running)/decelerating (regeneration) command such as a torque command sent from the ECU 21, which is primary control unit, to a current command in accordance with this command and to send the current command to the PWM driver 32 of the power circuitry 28.

Switching between acceleration (power running) and deceleration (regeneration) is performed on the basis of the command flag from the power running/regenerative control command module 21b of the ECU 21. The motor power running/regenerative control module 33 includes a power running controller 33a and a regenerative controller 33b, and either the power running controller 33a or the regenerative controller 33b is selectively used on the basis of the command flag from the power running/regenerative control command module 21b. The motor power running/regenerative control module 33 generates a command current value to the motor 6, on the basis of the command flag by using a torque command mapping table 35 (FIG. 5) which is preset in the inverter. The motor power running/regenerative control module 33 detects a value of current which actually flows through the motor 6 at this time, and controls the motor 6 through PI control in order to cause the current to match to the command current value.

The motor control unit 29 also includes a control parameter adjustment module 34 and a torque command mapping table adjustment module 38. The control parameter adjustment module 34 adjusts a PI control gain which is used in controlling the motor 6. The torque command mapping table adjustment module 38 automatically adjusts a torque command mapping table for each motor 6 in a ROM 46 in such a way that output values to left and right motor torques are equal to each other as described later. Signal communication among the ECU 21, the inverter device 22, the brake controller 23, and the steering unit 12 is performed as controller area network (CAN) communication.

Figure 3A:
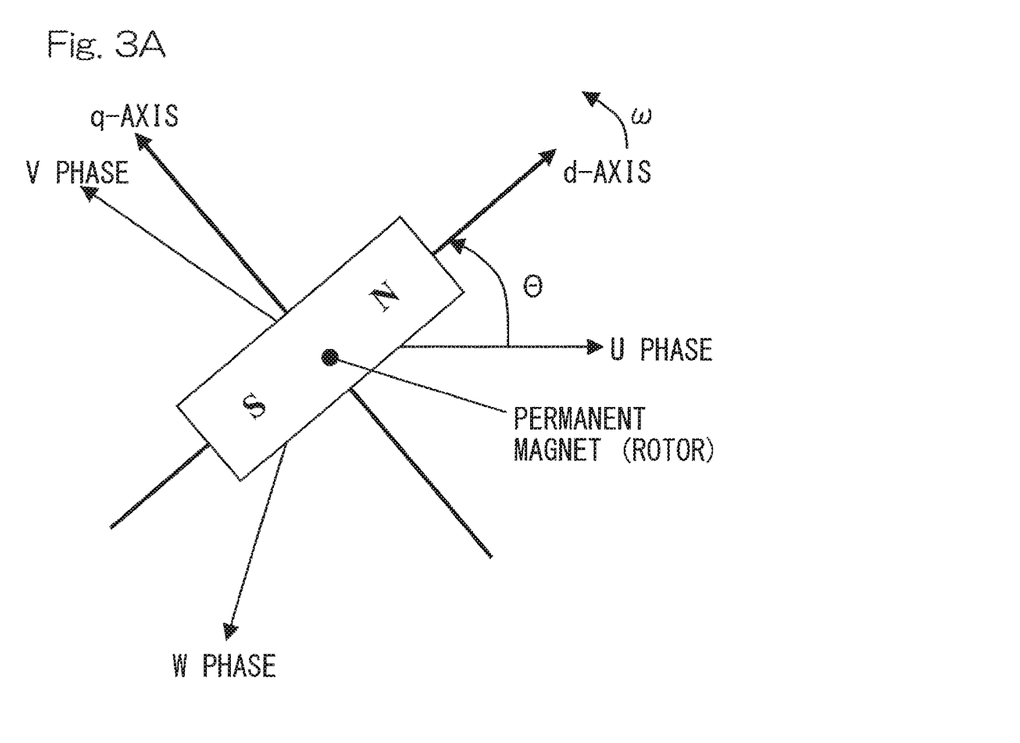
FIG. 3A is a schematic configuration diagram of an IPM motor of the electric vehicle shown in FIG. 1.
Figure 3B:
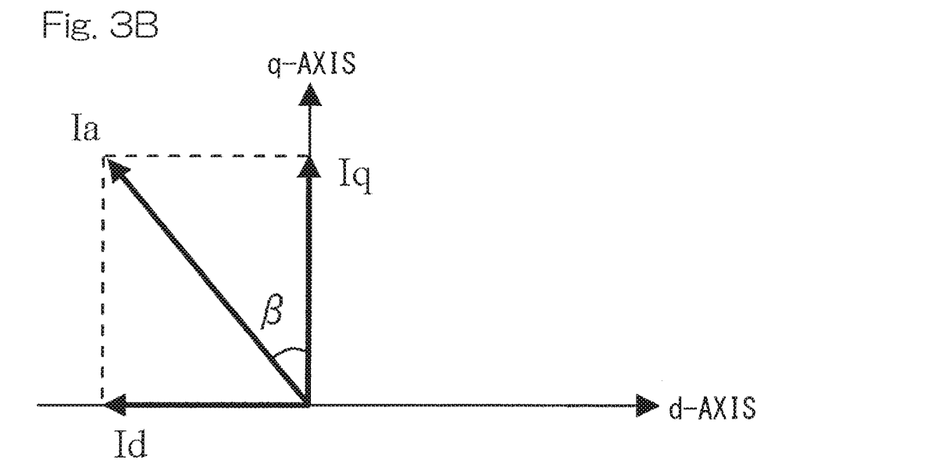
FIG. 3B is a schematic configuration diagram of the IPM motor of the electric vehicle shown in FIG. 1.

FIGS. 3A and 3B show schematic configuration diagrams of an IPM motor of the electric vehicle. As shown in FIG.

3A, in the case where the motor 6 which drives the wheel is an IPM motor, that is, an interior magnet synchronous motor, a magnetic resistance in the direction of a q-axis orthogonal to a d-axis which is a magnet axis is lower than that in the direction of the d-axis, thus the motor 6 has a salient pole structure, and a q-axis inductance Lq becomes higher than a d-axis inductance Ld. Depending on the salient pole structure, a reluctance torque Tr can be used in addition to a magnetic torque Tm, so that a high torque and high efficiency can be achieved.

The magnet torque Tm is a torque generated by attraction and repelling of a magnetic field generated by a permanent magnet of a rotor and a rotating magnetic field generated by a winding.

The reluctance torque Tr is a torque generated by a salient pole portion of the rotor being attracted to the rotating magnetic field generated by the winding.

A total torque generated by the motor is as follows.

$$T = p \times \{Ke \times Iq + (Ld - Lq) \times Id \times Iq\} = Tm + Tr$$

p: the number of pole pairs
Ld: the d-axis inductance of the motor
Lq: the q-axis inductance of the motor
Ke: an effective value of a motor induced voltage constant
Iq: a q-axis current that is a torque generation current
Id: a d-axis current that is a magnetic flux generation current A vector control method is well-known in which, as shown in FIG. 3B, a primary current Ia flowing to the IPM motor is split into a q-axis current Iq that is a torque generation current and a d-axis current Id that is a magnetic flux generation current, and the q-axis current Iq and the d-axis current Id can be independently controlled.

$$Id = -Ia \times \sin \beta$$

$$Iq = Ia \times \cos \beta$$

β: a current advance angle

Figure 4:
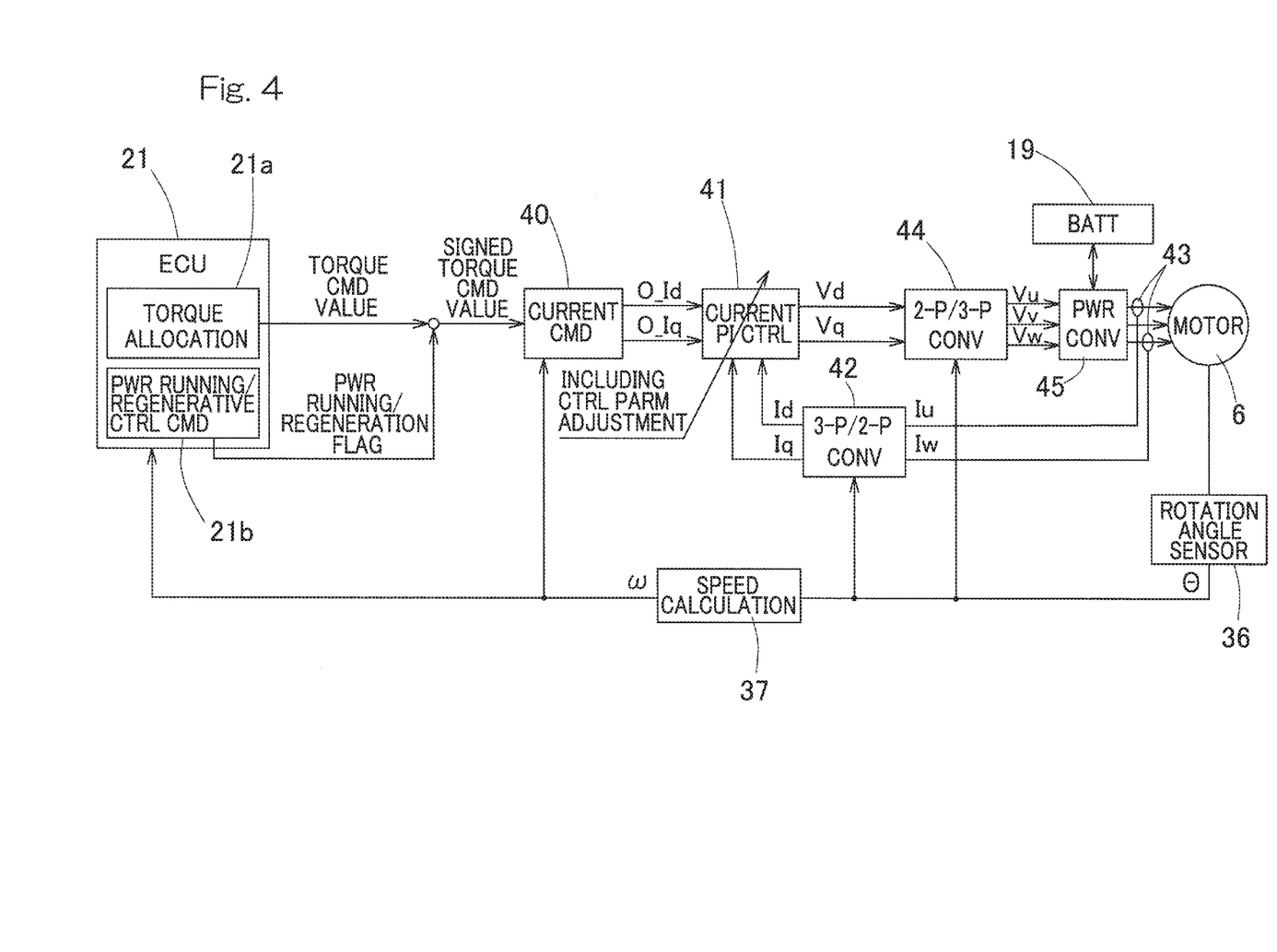
FIG. 4 is a block diagram of a torque control system of a motor control unit of the electric vehicle shown in FIG. 1.

FIG. 4 is a block diagram of a torque control system of the motor control unit 29 of the electric vehicle. A description will be given also with reference to FIG. 2. The motor control unit 29 is configured to control a motor drive current and includes a current command section 40 (FIG. 4). The current command section 40 generates an appropriate command current by using the torque command mapping table 35 (FIG. 5) which is preset in the inverter of the inverter device 22, on the basis of: a vehicle speed calculated by a speed calculation module (vehicle speed detection module) 37 on the basis of a rotor angle detected by the rotation angle sensor 36; and a torque command value which is an accelerating/decelerating command generated by the torque allocation module 21a of the ECU 21. That is, the current command section 40 performs PI feedback control for eliminating a deviation relative to the command current value generated in the inverter, in accordance with the torque command value from the ECU 21. The direction of the command current is switched on the basis of the command flag sent from the power running/regenerative control command module 21b of the ECU 21, so that a signed torque command value is generated.

The motor power running/regenerative control module 33 receives the rotation angle of the rotor of the motor 6 from the rotation angle sensor 36 via the torque command mapping table adjustment module 38 and performs vector control. Here, in each of the motors 6 provided to the left and right rear wheels 2 on the vehicle body, torque generation directions are different between during power running and during regeneration. That is, when each motor 6 is seen from the direction of an output shaft thereof, if the motor 6 for driving the left rear wheel generates a torque in the CW direction, the motor 6 for driving the right rear wheel generates a torque in the CCW direction (the left and right sides are determined in the direction in which the vehicle is seen from the rear side). If the torques generated in the motors 6 at the left and right sides have the same direction as seen from the output shaft direction, either one of these torques may be transmitted via the reducer 7 and the wheel bearing 4 to the tire while the direction thereof is reversed. In addition, the torque generation directions during regeneration in the motors 6 at the left and right tires are different from the torque generation directions during power running As the torque command value, an appropriate value is derived from the torque command mapping table 35 (see FIG. 5), which corresponds to a maximum torque control table, in accordance with an accelerating signal and a rotation speed of the motor 6. The current command section 40 obtains the primary current (Ia) and the current advance angle (β) of the motor 6 in accordance with the calculated torque command value. The current command section 40 generates two command currents, a d-axis current (magnetic field component) O_Id and a q-axis current O_Iq on the basis of the values of the primary current (Ia) and the current advance angle (β) (FIG. 3B).

A current PI control section 41 calculates control variables Vd and Vq as voltage values, by PI control, from the values of the d-axis current O_Id and the q-axis current O_Iq outputted from the current command section 40 and two-phase currents Id and Iq which are calculated by a three phase/two phase conversion section 42 on the basis of the motor current and the rotor angle. The three phase/two phase conversion section 42 obtains a v-phase current (Iv), which is calculated by the following equation, Iv=−(Iu+Iw), on the basis of detection values of a u-phase current (Iu) and a w-phase current (Iw) of the motor 6 which are detected by current sensors 43, and converts the three-phase currents Iu, Iv, and Iw to two-phase currents Id and Iq. The rotor angle of the motor 6 which is used for the conversion is fed from the rotation angle sensor 36. The rotor angle of the motor 6 which is used for this conversion is fed from the rotation angle sensor 36. The detected value of the rotation angle, that is, the phase, is corrected by a rotation angle correction section (not shown), whereby the motor 6 can be accurately controlled.

A two phase/three phase conversion section 44 converts the inputted two-phase voltage control variables Vd and Vq by using the value of the rotation angle corrected by the rotation angle correction section, to three-phase PWM duty voltage values Vu, Vv, and Vw. A power conversion section 45 corresponding to the power circuitry 28 (FIG. 2) performs PWM control of the inverter 31 (FIG. 2) in accordance with the PWM duty values Vu, Vv, and Vw, and drives the motor 6.

Figure 5:
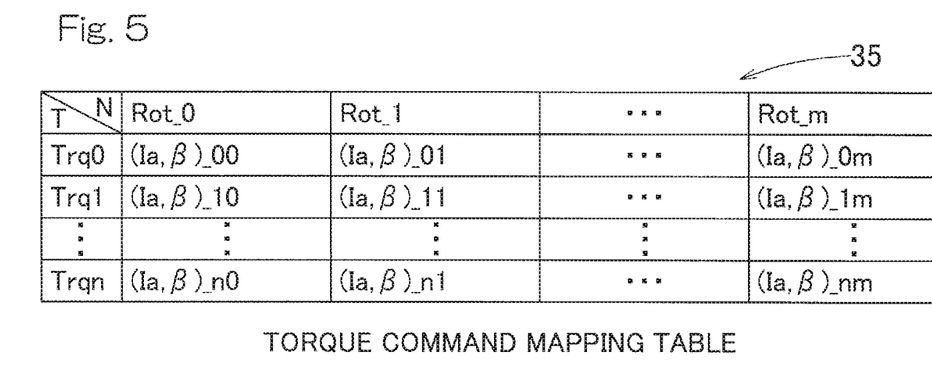
FIG. 5 is a diagram showing a torque command mapping table for a motor in a control device for the electric vehicle shown in FIG. 1.

FIG. 5 is a diagram showing the torque command mapping table 35 for the motor. The torque command mapping table 35 shown in FIG. 5 is created beforehand by a motor bench test and recorded in or written in the ROM 46 (FIG. 2) provided in a CPU or the like in the inverter device.

The letters in the table of FIG. 5 are as follows.
N: rotation speed
T: torque command value
Rot_0, Rot_1, . . . , Rot_m: respective rotation speeds Trq0, Trq1, . . . , Trqn: respective torque command values (Ia, β)_ij: command value including a primary current Ia and a current advance angle β, when the torque command value T is Trqi and the rotation speed N is Rot_j For torque control of the motor, a primary current (Ia) and a current advance angle (β) are derived from the torque command mapping table 35 on the basis of an accelerating signal. Then, the motor is controlled. In addition, the torque generation current q-axis current Iq and the magnetic flux generation current d-axis current Id are obtained from the primary current (Ia) and the current advance angle (β).

$$Id = -Ia \times \sin \beta$$

$$Iq = Ia \times \cos \beta$$

Figure 6:
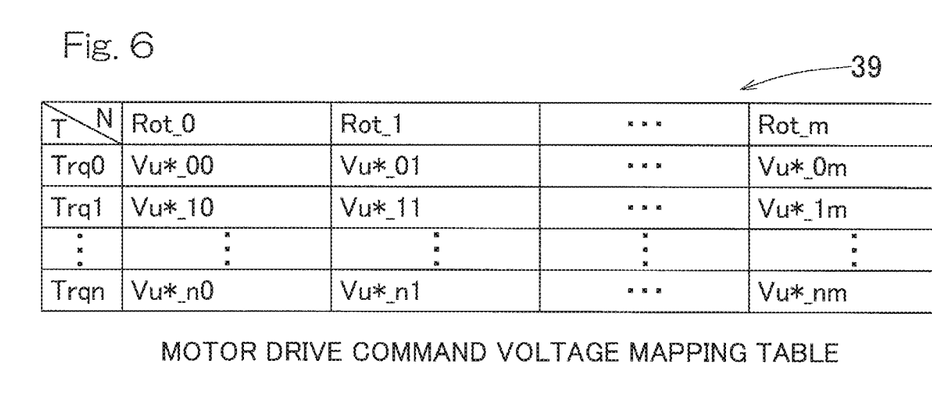
FIG. 6 is a diagram showing a motor drive command voltage mapping table of the control device.

FIG. 6 is a diagram showing a motor drive command voltage mapping table 39. The torque command mapping table adjustment module 38 (FIG. 2) writes effective values of command voltages to the motor drive command voltage mapping table 39, which effective values corresponding to the respective command values (Ia, β) in the torque command mapping table 35 (FIG. 5). For example, effective values Vu of U-phase command voltages are recorded as in FIG. 6. Here, Vu*_ij is an effective value of the U-phase command voltage when the torque command value T is Trqi and the rotation speed N is Rot_j.

Figure 7:
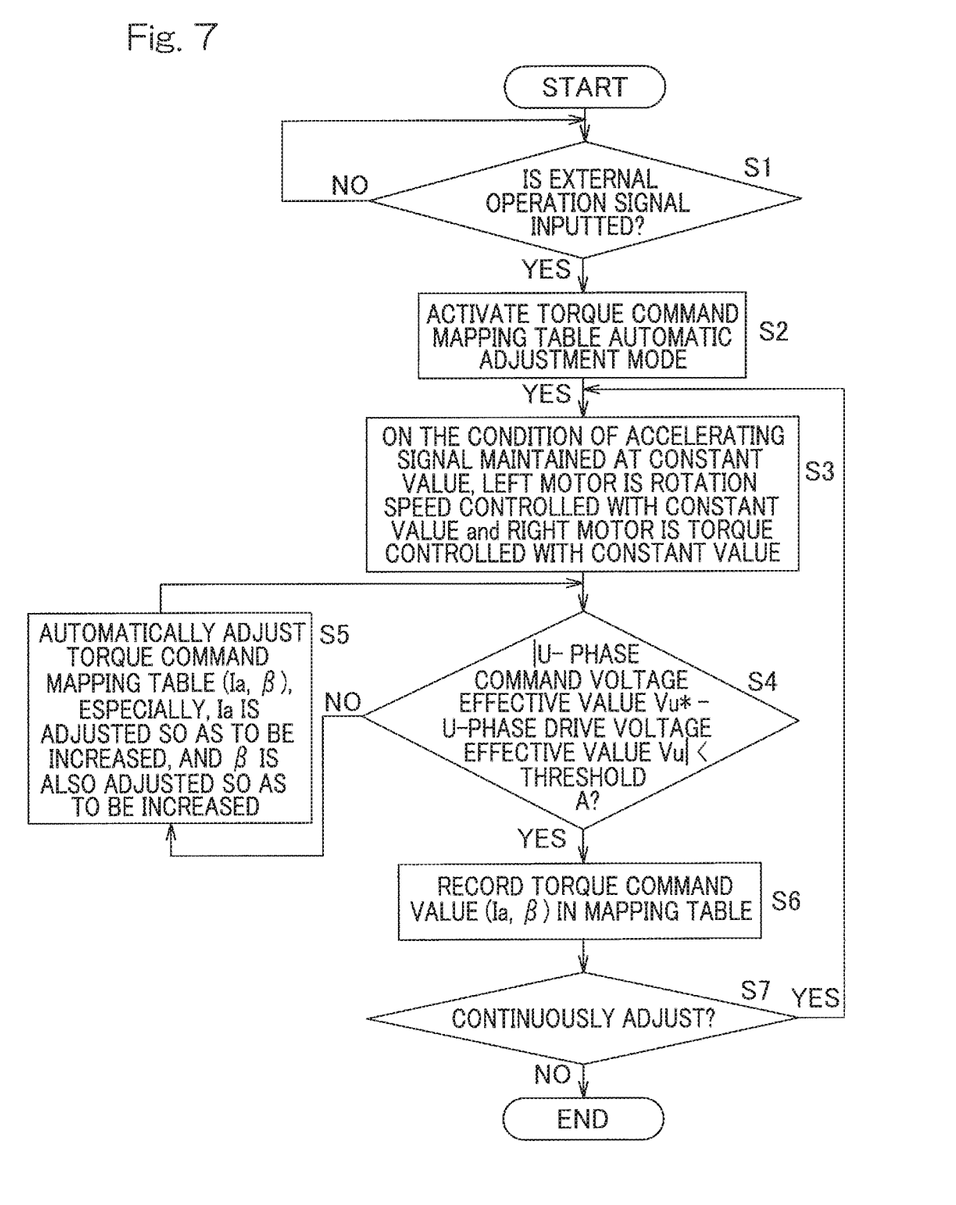
FIG. 7 is a flowchart showing a method for automatically adjusting the torque command mapping table used for controlling the motor.

FIG. 7 is a flowchart showing a method for automatically adjusting the torque command mapping table that is used for controlling the motor, in the control device of the electric vehicle. This adjusting method is executed by the torque command mapping table adjustment module 38 during running of the vehicle. After start of the process of this method, if it is determined in step S1 that an input signal from an external operation signal (e.g., a switch, a button, etc.) is inputted (YES of step S1), the process shifts to step S2 in which a torque command mapping table automatic adjustment mode is activated. If it is determined in step S1 that no input signal is inputted (NO of step S1), the process returns to step S1 again.

After step S2, the process shifts to step S3 in which, on the condition of the accelerating signal that is maintained at a constant value, for example, the left motor is controlled through rotation speed control, and the right motor is controlled through torque control. In this case, the torque command mapping table for the right motor is automatically adjusted.

The adjusting process will be described next. In this adjusting process adjustment is performed on the basis of a constant rotation speed under a condition of a constant command torque value. A state where such adjustment is possible is a stable state where the rotation speed control of the left motor and the torque control of the right motor coordinate with each other, that is, the controls are in agreement with each other.

1. A phase command voltage effective value (e.g., a U-phase command voltage effective value) for the right motor is extracted from the motor drive command voltage mapping table 39, and it is determined whether the absolute value of subtracting a U-phase drive voltage effective value from the U-phase command voltage effective value is less than a threshold A (step S4). The U-phase drive voltage effective value Vu is calculated from data of an instantaneous value recorded by the CPU. The threshold A is set, on the basis of, for example, a motor bench test, simulation, or the like, as such a value that the difference between the U-phase command voltage effective value and the U-phase drive voltage effective value is small to the extent practical.

2. If the absolute value of subtracting the U-phase drive voltage effective value from the U-phase command voltage effective value is equal to or greater than the threshold A (NO of step S4), the primary current Ia and the current advance angle β in the torque command mapping table 35 are adjusted so as to be increased (step S5). In this case, in adjustment in an unstable state where the rotation speed control of the left motor and the torque control of the right motor do not coordinate with each other, an adjustment ratio in the state where the rotation speed control and the torque control coordinate with each other is used to adjust (Ia, β) that have not been adjusted. The adjustment ratio is obtained by dividing Ia and β that have not been adjusted, by adjusted Ia and β, respectively. The smaller the adjustment ratio is made, the more finely the torque command mapping table can be adjusted. Thereafter, the process returns to step S4.

If the absolute value is less than the threshold A in step S4 (YES of step S4), the adjusted command values (Ia, β) are recorded in or written into the torque command mapping table 35 (step S6). Next, it is determined whether to continuously adjust the torque command mapping table 35 (step S7). If it is determined to continuously adjust the torque command mapping table 35 (YES of step S7), the process returns to step S3. If it is determined not to continuously adjust the torque command mapping table 35 (NO of step S7), the process is ended.

In adjusting the torque command mapping table for the left motor, rotation speed control of the right motor is performed, and torque control of the left motor is performed, whereby the torque command mapping table can be adjusted similarly to the above.

Figure 8A:
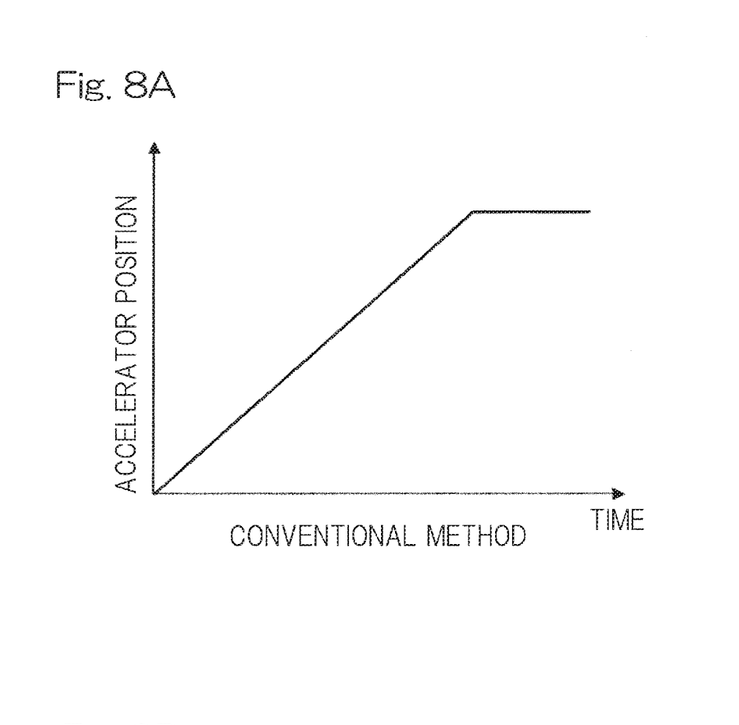
FIG. 8A is a diagram schematically showing an accelerator position manipulation method related to the control device for the electric vehicle.
Figure 8B:
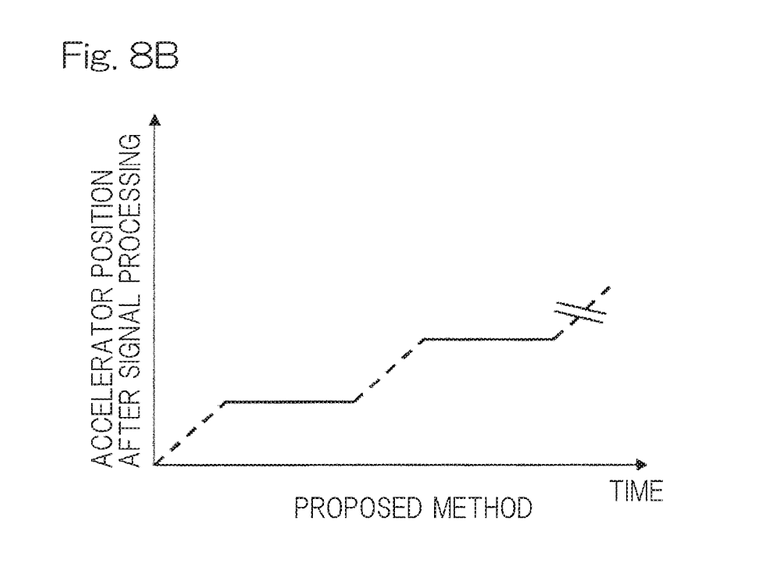
FIG. 8B is a diagram schematically showing the accelerator position manipulating method related to the control device for the electric vehicle.

FIGS. 8A and 8B are diagrams, each schematically showing an accelerator position manipulation method related to the control device of the electric vehicle. In a method in which an accelerator position is monotonously increased with passage of time and then is continuously maintained at a constant value as shown in FIG. 8A, it is difficult to perform rotation speed control of the motor. In an accelerator position signal processing method in which an operation of increasing an accelerator position and then maintaining the accelerator position at a constant value within a certain time is performed a plurality of times as shown in FIG. 8B, it is easy to perform rotation speed control. Thus, in this method data resulting from signal processing does not change even though an accelerator position signal changes within a certain time. In this embodiment, the rotation speed control is performed due to the accelerator position signal processing method shown in FIG. 8B on the motor other than the motor for which the torque command mapping table is to be adjusted.

Advantageous effects will be described. The torque command mapping table adjustment module 38 adjusts the torque command mapping table 35 (FIG. 5) with respect to: the vehicle speed fed from the vehicle speed detection module 37 (FIG. 4); and the torque command from the ECU 21, upon application of the input signal from the external operation signal during running of the vehicle. For example, the torque command mapping table adjustment module 38 extracts the phase command voltage effective value for the motor 6 from the motor drive command voltage mapping table 39 (FIG. 6) in which a phase command voltage is defined with respect to a rotation speed and a torque of the motor. Then, the module 38 automatically adjusts the command values (Ia, β) in the torque command mapping table 35 in such a way that the phase command voltage effective value and a phase drive voltage effective value for the same phase are equal to or equivalent to each other, that is, it is determined as YES in step S4 in FIG. 7. The torque command mapping table 35 corresponds to the motor drive command voltage mapping table 39.

Therefore, even if a problem due to aged deterioration or the like arises in a motor 6, a desired motor torque can be developed in the motor 6 by adjusting the torque command mapping table 35 for the motor 6. For example, influence, on running of the vehicle, due to left and right motors 6 in which the motor torques developed are different from each other, can be alleviated by causing the left and right motors 6 to exert equal or equivalent motor torques. Thus, the straight-running stability of the vehicle is improved.

If the degree of deterioration due to aged deterioration or the like is different between the left and right motors 6, the torque command mapping table adjustment module 38 of each motor control unit 29 adjusts the torque command mapping table 35 for each motor 6 in such a way that equal or equivalent motor torques can be developed in the left and right motors 6 during running of the vehicle. Therefore, influence on running of the vehicle due to the difference between the torques developed in the left and right motors is alleviated.

In this embodiment, the left and right rear drive wheels are employed, but the drive wheels are not limited to this configuration. For example, the left and right front drive wheels may be employed, which drive wheels are driven by individual motors, and the left and right rear driven wheels may be employed. In addition, the present invention is also applicable to an electric vehicle having four wheels driven by individual motors.

The ECU and the inverter device may be housed within the same casing, or may be provided separately. In adjusting the torque command mapping table, the primary current Ia and the current advance angle β may be adjusted so as to be decreased. The determination in step S7 in FIG. 7 may be omitted.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 2, 3 . . . wheel
4 . . . wheel bearing
6 . . . motor
7 . . . reducer
8 . . . in-wheel motor drive device
21 . . . ECU
22 . . . inverter device
28 . . . power circuitry
29 . . . motor control unit
31 . . . inverter
35 . . . torque command mapping table
36 . . . rotation angle sensor
37 . . . speed calculation section (vehicle speed detection module)
38 . . . torque command mapping table adjustment module
39 . . . motor drive command voltage mapping table

What is claimed is:

1. A control device for an electric vehicle having a motor and a rotation angle sensor, the control device comprising:
an electric control unit (ECU) configured to perform general control of the electric vehicle; and
an inverter device including having power circuitry including an inverter configured to convert a DC power into an AC power used to drive the motor and a motor control unit configured to control the power circuitry in accordance with a torque command from the ECU,
wherein the motor control unit is configured to receive a rotation angle of a rotor of the motor from the rotation angle sensor to perform control in accordance with the rotation angle of the rotor, the control being based on a torque command mapping table in which a command value is determined based on a rotation speed and a torque of the motor, and
the motor control unit includes a torque command mapping table adjustment module configured to adjust the torque command mapping table, according to a predetermined rule, with respect to; a speed of the vehicle obtained by a vehicle speed detection module based on the rotation angle that is detected by the rotation angle sensor, and the torque command from the ECU,
the vehicle includes a plurality of the motors which independently drive left and right wheels, and the motor control unit is provided for each of the motors, and
when the torque command mapping table adjustment module adjusts the torque command mapping table for one of the motors, the one of the motors is torque controlled by the motor control unit associated with the one of the motors and the other motor is rotation-speed controlled.

2. The control device for the electric vehicle as claimed in claim 1, wherein the motor control unit includes a motor drive command voltage mapping table in which a phase command voltage with respect to a rotation speed and a torque of the motor is defined, and
the torque command mapping table adjustment module extracts a phase command voltage for the one of the motors from the motor drive command voltage mapping table in a state where the one of the motors rotates at a constant motor rotation speed, and adjusts the torque command mapping table in such a way that the extracted phase command voltage is equivalent to a phase drive voltage.

3. The control device for the electric vehicle as claimed in claim 2, wherein the torque command mapping table adjustment module adjusts the torque command mapping table such that, if an absolute value of subtracting the phase drive voltage from the phase command voltage is less than a predetermined threshold, the torque command mapping table adjustment module determines that the phase command voltage is equivalent to the phase drive voltage.

4. The control device for the electric vehicle as claimed in claim 1, wherein the motor drives any one or both of a front wheel and a rear wheel of the vehicle and constitutes a part of an in-wheel motor drive device which includes the motor, a wheel bearing, and a reducer.

* * * * *

UNITED STATES PATENT AND TRADEMARK OFFICE
CERTIFICATE OF CORRECTION

PATENT NO. : 9,855,858 B2
APPLICATION NO. : 15/054680
DATED : January 2, 2018
INVENTOR(S) : Guodong Li et al.

It is certified that error appears in the above-identified patent and that said Letters Patent is hereby corrected as shown below:

In the Claims

Column 12, Line 8:
In Claim 1, after "device" delete "including".

Column 12, Line 23:
In Claim 1, after "to" delete ";".

Signed and Sealed this
Tenth Day of April, 2018

Andrei Iancu
*Director of the United States Patent and Trademark Office*